(12) United States Patent
Jeong

(10) Patent No.: US 11,947,143 B2
(45) Date of Patent: Apr. 2, 2024

(54) FILMING APPARATUS FOR VEHICLE

(71) Applicants: HYUNDAI MOTOR COMPANY, Seoul (KR); KIA MOTORS CORPORATION, Seoul (KR)

(72) Inventor: Dong Hyuk Jeong, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 526 days.

(21) Appl. No.: 17/187,188

(22) Filed: Feb. 26, 2021

(65) Prior Publication Data
US 2022/0146730 A1    May 12, 2022

(30) Foreign Application Priority Data

Nov. 9, 2020 (KR) .................. 10-2020-0148482

(51) Int. Cl.
*G02B 5/30* (2006.01)
*B60J 1/02* (2006.01)
*B60J 3/06* (2006.01)

(52) U.S. Cl.
CPC .............. *G02B 5/3025* (2013.01); *B60J 1/02* (2013.01); *B60J 3/06* (2013.01)

(58) Field of Classification Search
CPC .. G02B 5/3025; G02B 26/00; G02B 27/0018; G02B 5/3033; B60J 1/02; B60J 3/06; G03B 11/00; B60R 11/04; H04N 23/55; H04N 23/57
See application file for complete search history.

(56) References Cited

U.S. PATENT DOCUMENTS

| | | | | |
|---|---|---|---|---|
| 8,305,295 B2* | 11/2012 | Lvovskiy | ........... | G02B 27/0101 345/1.3 |
| 2009/0195875 A1* | 8/2009 | Pasca | ................ | G02B 27/0101 359/489.07 |
| 2012/0162961 A1* | 6/2012 | Brandt | ....................... | B60J 3/06 362/19 |
| 2013/0328942 A1* | 12/2013 | Chen | ....................... | G02B 5/02 345/690 |
| 2019/0056589 A1* | 2/2019 | Sakai | ..................... | B60K 35/00 |
| 2022/0075189 A1* | 3/2022 | Hirata | ................ | G02B 27/0018 |
| 2022/0155589 A1* | 5/2022 | Hirata | ........................ | B60J 1/02 |
| 2022/0221718 A1* | 7/2022 | Anzai | .................. | G02B 5/3025 |

FOREIGN PATENT DOCUMENTS

| | | | | |
|---|---|---|---|---|
| EP | 3696582 A1 * | 8/2020 | .............. | G02B 5/30 |
| KR | 10-1499949 | 3/2015 | | |

* cited by examiner

*Primary Examiner* — Magda Cruz
(74) *Attorney, Agent, or Firm* — Fox Rothschild LLP

(57) ABSTRACT

A filming apparatus installed in an interior of a vehicle to film images reflected on a windshield glass is provided. The apparatus may include a polarizing filter provided on a front surface or a rear surface of a lens, or a front surface of an image sensor, a transmission factor of the polarizing filter being lower at a first point than a second point, where reflected light is input from a portion of the windshield glass at the first point and a shimmering occurs at the first point.

13 Claims, 2 Drawing Sheets

Flat polarizing filter          Curved polarizing filter

FILMING APPARATUS FOR VEHICLE

CROSS-REFERENCE TO RELATED APPLICATION

The present application claims priority to and the benefit of Korean Patent Application No. 10-2020-0148482, filed Nov. 9, 2020, the entire contents of which is incorporated herein for all purposes by this reference.

TECHNICAL FIELD

The present disclosure relates to a filming apparatus installed in the interior of a vehicle to film images towards the windshield glass thereof.

BACKGROUND

A shimmering phenomenon refers to a situation in which an indoor object is reflected by glass or the like and is seen by an observer positioned indoors. Such a shimmering phenomenon commonly occurs, in connection with a vehicle, when the image of the vehicle dashboard or a speaker, an air conditioning device, or the like provided on the dashboard is reflected by the front windshield glass of the vehicle and is seen by the driver or occupants. The occurrence of such a shimmering phenomenon may limit the driver's field of view and thus poses a risk of accidents. In addition, the quality of images filmed by a filming apparatus (for example, a black box) are heavily degraded by such a shimmering phenomenon.

A polarizing filter is used to remove the shimmering phenomenon. The polarizing filter filters out light that is reflected and is introduced as a result of shimmering, thereby preventing the shimmering phenomenon. However, simple application of a polarizing filter to a filming apparatus (for example, a dash cam or a black box) of a vehicle has a problem in that, although the shimmering phenomenon is alleviated, images filmed by the filming apparatus become dark generally. In addition, in the case of a tinted windshield, a moire or rainbow phenomenon occurs in parts of images corresponding to the sky, thereby degrading the image quality.

Therefore, it is necessary to develop a filming apparatus for a vehicle, which not only can prevent the shimmering phenomenon by using a polarizing filter, but also can remove problems resulting from use of the polarizing filter.

The above descriptions regarding background arts are only for helping understanding of the background of the present disclosure, and are not to be considered by a person skilled in the art as corresponding to already-known prior arts.

SUMMARY

The present disclosure provides a filming apparatus installed in the interior of a vehicle to film images towards windshield glass, the filming apparatus employing a polarizing filter provided on the front or rear surface of a lens to which light is input, or on the front surface of an image sensor, thereby removing the shimmering phenomenon occurring in the filmed images.

An aspect of the present disclosure provides a filming apparatus for a vehicle, which is installed in the interior of a vehicle to film images towards windshield glass, wherein a polarizing filter is provided on a front surface or a rear surface of a lens to which light is input, or a front surface of an image sensor, and the transmission factor of the polarizing filter is lower at a point, at which reflected light is input from a portion of the windshield glass, at which shimmering occurs, than at other points.

The polarizing filter may include: a first filter part, to which the reflected light is input from a portion of the windshield glass, at which the shimmering does not occur; and a second filter part, to which the reflected light is input from the portion of the windshield glass, at which the shimmering occurs.

The first filter part of the polarizing filter may be disposed such that the transmission factor of light thereof is high, and the second filter part of the polarizing filter may be disposed such that the transmission factor of light thereof becomes lower as it goes from a point that is close to the first filter part toward a point that is distant from the first filter part.

The first filter part of the polarizing filter may be disposed such that the transmission factor of light thereof is high, and the second filter part of the polarizing filter may be disposed such that the transmission factor of light thereof is different according to an angle, at which the reflected light is input to the second filter part, or the intensity of light input to the second filter part.

A shimmering border, at which the first filter part and the second filter part contact each other, may be disposed between the first filter part and the second filter part, and the shimmering border may be disposed along a point, at which the reflected light is input from a border between the portion of the windshield glass, at which the shimmering occurs, and the portion of the windshield glass, at which the shimmering does not occur.

The shimmering border may be disposed to be linear or nonlinear, or to be straight, curved, or radial according to an angle, at which the reflected light is input to the polarizing filter, or the intensity of light input to the polarizing filter.

A polarization adjustor may be provided on one side of the polarizing filter, and the transmission factor of the light that passes through the polarizing filter may be changed by adjusting the location of the polarizing filter according to an angle, at which the reflected light is input to the polarizing filter or the intensity of light input to the polarizing filter.

An illumination sensor may be provided in the vehicle, the polarizing filter, or the polarization adjustor, the polarization adjustor may measure the intensity of light input to the polarizing filter through the illumination sensor, and the location of the polarizing filter may be adjusted according to the intensity of light input to the polarizing filter.

The polarizing filter may be disposed to be flat or curved, and the polarization adjustor may be rotated while contacting one surface of the polarizing filter to be slid in a predetermined direction.

A slide guide may be provided in the polarization adjustor, and the polarizing filter may be slid along the slide guide when being slid by the polarization adjustor or received in the sliding guide.

According to the present disclosure, a filming apparatus for a vehicle may be installed in the interior of a vehicle to film images towards windshield glass, and the filming apparatus may employ a polarizing filter provided on the front or rear surface of a lens to which light is input, or on the front surface of an image sensor, thereby removing the shimmering phenomenon occurring in the filmed images.

DRAWINGS

The above and other aspects, features and advantages of the present disclosure will be more apparent from the following detailed description taken in conjunction with the accompanying drawings, in which.

Figure 3:
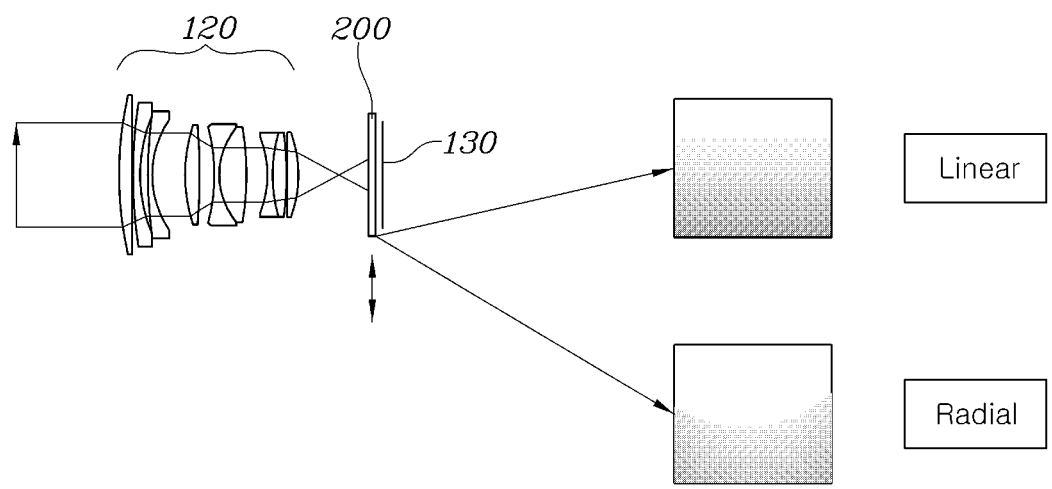
Figure 4:
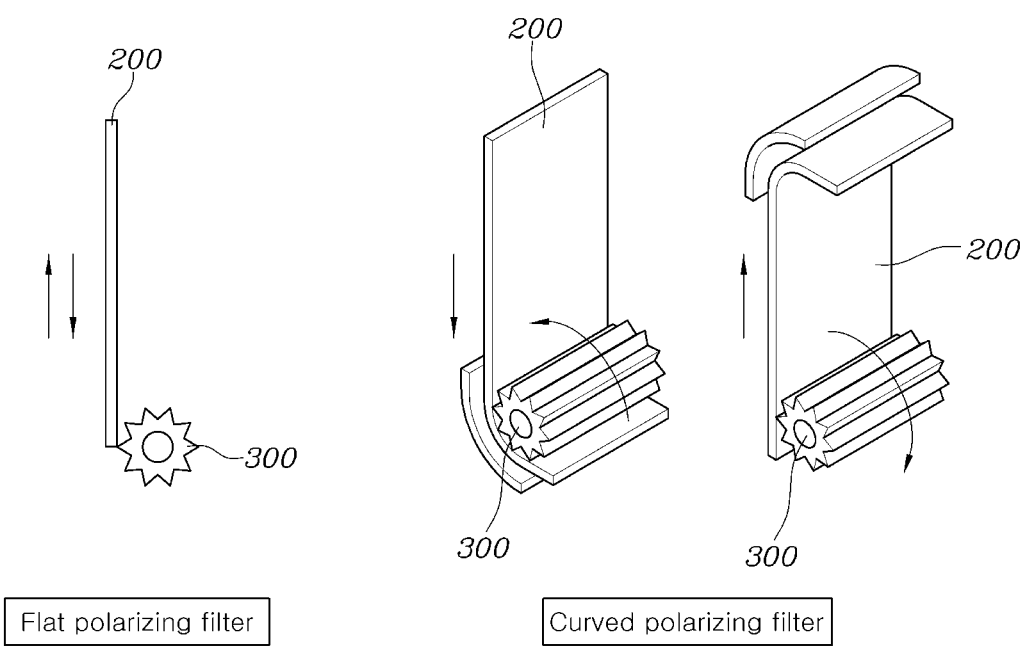

FIG. 3 is a view illustrating a state in which the polarizing filter is provided on a rear surface of the lens or a front surface of an image sensor in the filming apparatus for a vehicle in one form of the present disclosure; and FIG. 4 is a view illustrating a state in which the polarizing filter is slid by a polarization adjustor in the filming apparatus for a vehicle in one form of the present disclosure.

DETAILED DESCRIPTION

Figure 1:
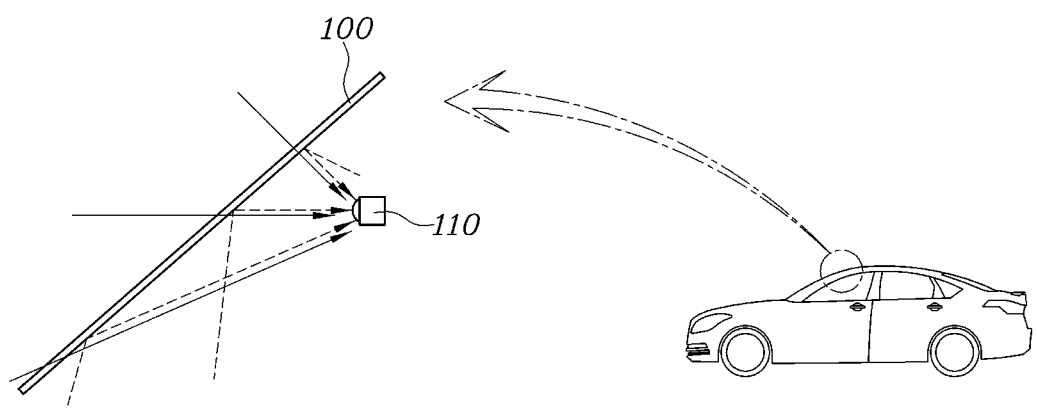
FIG. 1 is a view illustrating a state in which a filming apparatus for a vehicle is provided on a rear side of a front windshield glass of a vehicle and light is input to the filming apparatus for a vehicle in one form of the present disclosure.
Figure 2:
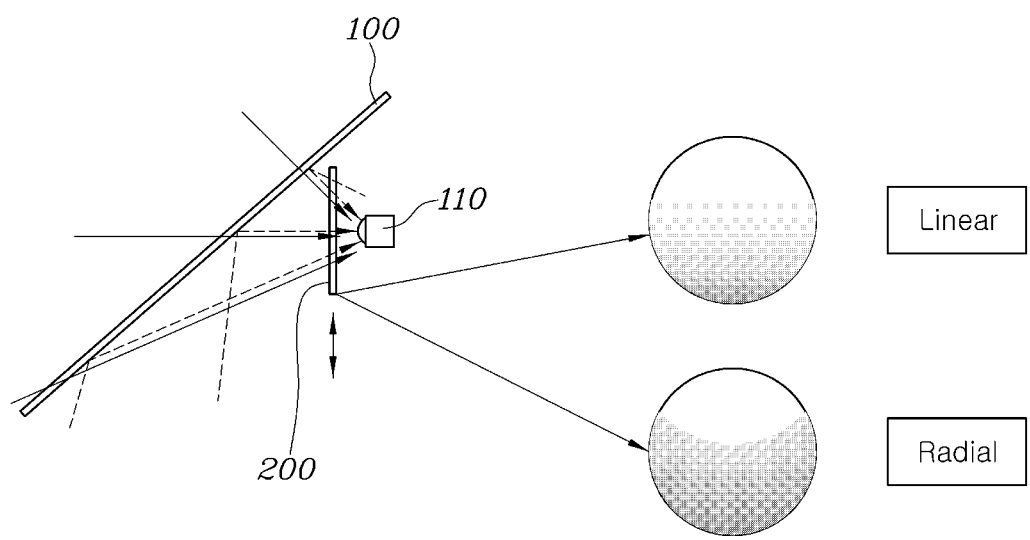
FIG. 2 is a view illustrating a state in which a polarizing filter is provided on a front surface of a lens in the filming apparatus for a vehicle in one form of the present disclosure.

FIG. 1 is a view illustrating a state in which a filming apparatus for a vehicle is provided on a rear side of a front windshield glass of a vehicle and light is input to the filming apparatus for a vehicle in some forms of the present disclosure. FIG. 2 is a view illustrating a state in which a polarizing filter is provided on a front surface of a lens in the filming apparatus for a vehicle in some forms of the present disclosure. FIG. 3 is a view illustrating a state in which the polarizing filter is provided on a rear surface of the lens or a front surface of an image sensor in the filming apparatus for a vehicle in some forms of the present disclosure. FIG. 4 is a view illustrating a state in which the polarizing filter is slid by a polarization adjustor in the filming apparatus for a vehicle in some forms of the present disclosure.

FIG. 1 is a view illustrating a state in which a filming apparatus for a vehicle is provided on a rear side of a front windshield glass of a vehicle and light is input to the filming apparatus for a vehicle in some forms of the present disclosure. FIG. 2 is a view illustrating a state in which a polarizing filter is provided on a front surface of a lens in the filming apparatus for a vehicle in some forms of the present disclosure. FIG. 3 is a view illustrating a state in which the polarizing filter is provided on a rear surface of the lens or a front surface of an image sensor in the filming apparatus for a vehicle in some forms of the present disclosure. A filming apparatus for a vehicle according to an embodiment of the present disclosure is a filming apparatus 110 installed in the interior of a vehicle to film images toward windshield glass 100, wherein a polarizing filter 200 is provided on a front surface or a rear surface of a lens 120, to which light is input, or a front of an image sensor, and the transmission factor of the polarizing filter 200 is lower at a point, at which reflected light is input from a portion of the windshield glass 100, at which shimmering occurs, than at other points.

The filming apparatus for a vehicle is an image recording apparatus that records images in the interior or exterior of the vehicle, and includes a camera, a black box, or a front/rear camera provided in the interior of the vehicle, or an image recording apparatus that films images towards the outside of glass from the inside of the glass.

In detail, a polarizing filter 200 is provided on a front surface or a rear surface of a lens 120, to which light is input, or a front surface of an image sensor 130, and the polarizing filter 200 is disposed such that the transmission factor of the light is low only at a point, at which reflected light is input from a portion of windshield glass 100, at which shimmering occurs, whereby an entire image can be prevented from being dark overall by selectively applying a polarization effect only a portion, at which shimmering needs to be prevented, and different transmission factors of light are applied to the polarizing filter 200 according to the degree of shimmering when reflected light is input from a portion, at which shimmering occurs so that the polarizing filter 200 can be prevented from influencing the quality of the image at the portion, at which shimmering does not occur. When the windshield glass 100 is tinted, a moire or rainbow phenomenon generally occurs due to an interference with tinting at a sky portion of the captured image, and the moire or rainbow phenomenon can be minimized by excluding a polarization effect from the corresponding portion.

Meanwhile, a front black box is generally located at an upper end of a front windshield glass 100 of a vehicle, and accordingly, a shimmering phenomenon does not occur at an upper end of the captured image but a shimmering phenomenon becomes severe at a lower end of the image, starting from a middle portion of the image. Light from an interior device of the vehicle is reflected at an obtuse angle at an upper end of the windshield glass 100, and shimmering starts to occur as the light reflected from the interior device of the vehicle starts to have an obtuse angle component from a middle portion of the windshield glass 100. The obtuse angle component of the reflected light of the interior device of the vehicle is large at the lower end of the windshield glass 100, and thus the intensity of the shimmering becomes severe, deteriorating the quality of the image. Accordingly, in this case, a point, to which the light reflected by the upper end of the windshield glass 100 is input, has a high transmission factor and the transmission of the light becomes gradually lower as it goes toward the lower end of the windshield glass 100, whereby the shimmering phenomenon that becomes more severe as it goes toward the lower end of the windshield glass 100 can be effectively prevented.

In the filming apparatus for a vehicle according to the embodiment of the present disclosure, the polarizing filter 200 may include a first filter part, to which the reflected light is input from a portion of the windshield glass 100, at which the shimmering does not occur; and a second filter part, to which the reflected light is input from the portion of the windshield glass 100, at which the shimmering occurs. In the filming apparatus for a vehicle according to the embodiment of the present disclosure, the first filter part of the polarizing filter 200 may be disposed such that the transmission factor of light thereof is high, and the second filter part of the polarizing filter 200 may be disposed such that the transmission factor of light thereof becomes lower as it goes from a point that is close to the first filter part toward a point that is distant from the first filter part.

Referring to FIGS. 2 and 3, the front surface of the linear or radial polarizing filter 200 on the right side of FIGS. 2 and 3 may be viewed, and here, a bright point of the upper end is the first filter part having a high transmission factor of light and a dark point of the lower end is the second filter part having a low transmission factor of light.

Accordingly, because the light reflected by the interior device of the vehicle at points from the upper end to the middle portion of the windshield glass 100 is input to the first filter part and the first filter part corresponds to a point, to which the reflected light is input from the portion of the windshield glass, at which shimmering does not occur, the transmission factor of the light has a high value that is close to 100% and thus the quality of the image filmed by the filming apparatus 110 is prevented from being lowered. Further, because the light reflected by the interior device of the vehicle at points from the middle portion to the lower end of the windshield glass 100 is input to the second filter part and the second filter part corresponds to a point, to which the reflected light is input from the portion of the windshield glass, at which shimmering occurs, the transmission factor of the light has a lower value that becomes gradually lower from 100% to 35% as it goes toward the lower end of the windshield glass and thus the quality of the image filmed by the filming apparatus 110 is prevented from being lowered.

Meanwhile, in the filming apparatus for a vehicle according to the embodiment of the present disclosure, the first filter part of the polarizing filter 200 may be disposed such that the transmission factor of light thereof is high, and the second filter part of the polarizing filter 200 may be disposed such that the transmission factor of light thereof is different according to an angle, at which the reflected light is input to the second filter part, or the intensity of light input to the second filter part. Generally, because the filming apparatus 110 is located at the upper end of the windshield glass 100, the shimmering phenomenon becomes severe as it goes toward the lower end of the windshield glass 100.

However, the intensity of the shimmering is changed according to the angle of the reflected light input to the polarizing filter 200 or the intensity of light input to the polarizing filter 200, and for example, when the angle of the reflected light input to the polarizing filter 200 or the intensity of light input to the polarizing filter 200 is changed so that the shimmering phenomenon occurs to the left and right upper ends of the windshield glass 100, the polarizing filter 200 may be disposed such that the second filter part has a linear shape in which the transmission factor of light varies from the upper end to the lower end thereof while crossing the polarizing filter 200 and the second filter part has a curved or radial shape in which the transmission factor of light varies from the center of the second filter part to the left and right upper ends, at which the shimmering phenomenon occurs.

Further, in the filming apparatus for a vehicle according to the embodiment of the present disclosure, a shimmering border, at which the first filter part and the second filter part contact each other, is disposed between the first filter part and the second filter part, and the shimmering border is disposed along a point, at which the reflected light is input from a border between the portion of the windshield glass 100, at which the shimmering occurs, and the portion of the windshield glass 100, at which the shimmering does not occur. The shimmering border may be disposed to be linear or nonlinear, or straight, curved, or radial according to an angle, at which the reflected light is input to the polarizing filter 200, or the intensity of light input to the polarizing filter 200.

As described above, when a shimmering phenomenon does not occur constantly in the windshield glass 100, the sizes of the first filter part and the second filter part or the transmission factors of the second filter part at various points may be differently determined to be linear or nonlinear or differently determined to be straight, curved, or radial according the shimmering border.

FIG. 4 is a view illustrating a state in which the polarizing filter is slid by a polarization adjustor in the filming apparatus for a vehicle in some forms of the present disclosure. In the filming apparatus for a vehicle according to the embodiment of the present disclosure, a polarization adjustor 300 may be provided on one side of the polarizing filter 200, and the transmission factor of the light that passes through the polarizing filter 200 may be changed by adjusting the location of the polarizing filter 200 according to an angle, at which the reflected light is input to the polarizing filter 200 or the intensity of light input to the polarizing filter 200.

In detail, when the angle, at which the reflected light is input to the polarizing filter 200, or the intensity of light input to the polarizing filter 200 is changed, a point of the shimmering occurring in the windshield glass 100 is changed, and a point, to which the reflected light reflected at the portion of the polarizing filter 200, at which the shimmering phenomenon occurs, is also changed. Accordingly, because the polarizing filter 200 is moved by a degree, by which the point at which the reflected light is input from the portion at which the shimmering phenomenon occurs is moved, according to the angle at which the reflected light is input to the polarizing filter 200 or the intensity of light input to the polarizing filter 200, the shimmering phenomenon of the image captured through the polarizing filter 200 can be prevented without interruption.

In the filming apparatus for a vehicle according to the embodiment of the present disclosure, an illumination sensor may be provided in the vehicle, the polarizing filter 200, or the polarization adjustor 300, the polarization adjustor 300 may measure the intensity of light input to the polarizing filter 200 through the illumination sensor, and the location of the polarizing filter 200 may be adjusted according to the intensity of light input to the polarizing filter 200. The transmission factor of the light input to the lens 120 or the image sensor 130 may be changed by measuring the intensity of the light input to the polarizing filter 200 through the illumination sensor and thus classifying day and night or a time at which the intensity of the light is high or lower to adjust the location of the polarizing filter 200, and accordingly, a shimmering phenomenon in the captured image according to situations can be prevented and the brightness of the image can be prevented from being lowered due to excessive application of a polarization effect as well whereby the quality of the image can be improved.

Meanwhile, in the filming apparatus for a vehicle according to the embodiment of the present disclosure, the polarizing filter 200 may be disposed to be flat or curved, and the polarization adjustor 300 may be rotated while contacting one surface of the polarizing filter 200 to be slid in a predetermined direction. Further, in the filming apparatus for a vehicle according to the embodiment of the present disclosure, a slide guide is provided in the polarization adjustor 300, and the polarizing filter 200 is slid along the slide guide when being slid by the polarization adjustor 300 or received in the sliding guide.

In detail, the polarization adjustor 300 slides the polarizing filter 200 upwards and downwards to adjust the location of the polarizing filter 200, and the polarization adjustor 300 may include an actuator, a gear, a slide guide, and the like. The transmission factor of the polarizing filter 200 generally becomes lower as it goes from the upper end to the lower end thereof, and when the shimmering phenomenon is strong, the polarization adjustor 300 may be rotated to slide the polarizing filter 200 upwards so as to further decrease the transmission factor of the light input to the lens 120 or the image sensor 130, and when the shimmering phenomenon is weak, the polarization adjustor 300 may be rotated to slide the polarizing filter 200 downwards so as to further increase the transmission factor of the light input to the lens 120 or the image sensor 130. In other words, because the polarizing filter 200 is moved by the polarization adjustor 300 according to the intensity of the shimmering, a shimmering phenomenon can be prevented by adjusting the transmission factor of the light and the quality of the image filmed by the filming apparatus 110 can be improved.

Therefore, the disclosed embodiments of the present disclosure do not limit the technical spirit of the present disclosure but are illustrative, and the scope of the technical spirit of the present disclosure is not limited by the embodiments of the present disclosure. The scope of the present disclosure should be construed by the claims, and it will be understood that all the technical spirits within the equivalent range fall within the scope of the present disclosure.

What is claimed is:

1. A filming apparatus installed in an interior of a vehicle to film images reflected on windshield glass, comprising:
   a polarizing filter provided on a front surface or a rear surface of a lens, or a front surface of an image sensor, a transmission factor of the polarizing filter being lower at a first point than a second point, wherein reflected light is input from a portion of the windshield glass at the first point and a shimmering occurs at the first point, wherein the polarizing filter comprises:
   a first filter part that the shimmering does not occur, wherein the reflected light is input from a portion of the windshield glass to the first filter part; and
   a second filter part that the shimmering occurs, wherein the reflected light is input from the portion of the windshield glass to the second filter part.

2. The filming apparatus of claim 1, wherein:
   a transmission factor of the first filter part is higher than a predetermined value, and
   a transmission factor of the second filter part becomes lower than the predetermined value from a third point to a fourth point, wherein the third point is located within a predetermined distance from the first filter part, and the fourth point is located beyond the predetermined distance from the first filter part.

3. The filming apparatus of claim 1, wherein:
   a transmission factor of the first filter part is higher than a predetermined value, and
   a transmission factor of the second filter part corresponds to an angle, at which the reflected light is input to the second filter part, or the intensity of the reflected light input to the second filter part.

4. The filming apparatus of claim 1, wherein:
   a shimmering border, at which the first filter part contacts the second filter part, is disposed between the first filter part and the second filter part, and
   the shimmering border is disposed along a point, at which the reflected light is input from a border between a shimmering portion of the windshield glass and a non-shimmering portion of the windshield glass.

5. The filming apparatus of claim 4, wherein a shape of the shimmering border corresponds to an angle, at which the reflected light is input to the polarizing filter, or the intensity of light input to the polarizing filter.

6. The filming apparatus of claim 1, further comprising:
   a polarization adjustor provided on one side of the polarizing filter, wherein the polarization adjustor configured to:
   adjust a location of the polarizing filter corresponding to an angle, at which the reflected light is input to the polarizing filter or the intensity of the reflected light input to the polarizing filter; and
   change the transmission factor of the light that passes through the polarizing filter.

7. The filming apparatus of claim 6, further comprising:
   an illumination sensor provided in the vehicle, the polarizing filter, or the polarization adjustor, wherein the polarization adjustor is configured to:
   measure the intensity of light input to the polarizing filter through the illumination sensor; and
   adjust the location of the polarizing filter corresponding to the intensity of light input to the polarizing filter.

8. The filming apparatus of claim 6, wherein:
   the polarizing filter is disposed to be flat or curved, and
   the polarization adjustor is configured to rotate while contacting one surface of the polarizing filter and to move in a predetermined direction.

9. The filming apparatus of claim 8, wherein the polarization adjustor further comprising:
   a slide guide provided in the polarization adjustor, wherein the polarization adjustor is further configured to move the polarizing filter along the slide guide.

10. A filming apparatus installed in an interior of a vehicle to film images reflected on windshield glass, comprising:
    a polarizing filter provided on a front surface or a rear surface of a lens, or a front surface of an image sensor, a transmission factor of the polarizing filter being lower at a first point than a second point, wherein reflected light is input from a portion of the windshield glass at the first point and a shimmering occurs at the first point; and
    a polarization adjustor provided on one side of the polarizing filter, wherein the polarization adjustor is configured to:
    adjust a location of the polarizing filter corresponding to an angle, at which the reflected light is input to the polarizing filter or the intensity of the reflected light input to the polarizing filter; and
    change the transmission factor of the light that passes through the polarizing filter.

11. The filming apparatus of claim 10, further comprising:
    an illumination sensor provided in the vehicle, the polarizing filter, or the polarization adjustor, wherein the polarization adjustor is configured to:
    measure the intensity of light input to the polarizing filter through the illumination sensor; and
    adjust the location of the polarizing filter corresponding to the intensity of light input to the polarizing filter.

12. The filming apparatus of claim 10, wherein:
    the polarizing filter is disposed to be flat or curved, and
    the polarization adjustor is configured to rotate while contacting one surface of the polarizing filter and to move in a predetermined direction.

13. The filming apparatus of claim 12, wherein the polarization adjustor further comprising:
    a slide guide provided in the polarization adjustor, wherein the polarization adjustor is further configured to move the polarizing filter along the slide guide.

* * * * *